United States Patent Office 2,870,608
Patented Jan. 27, 1959

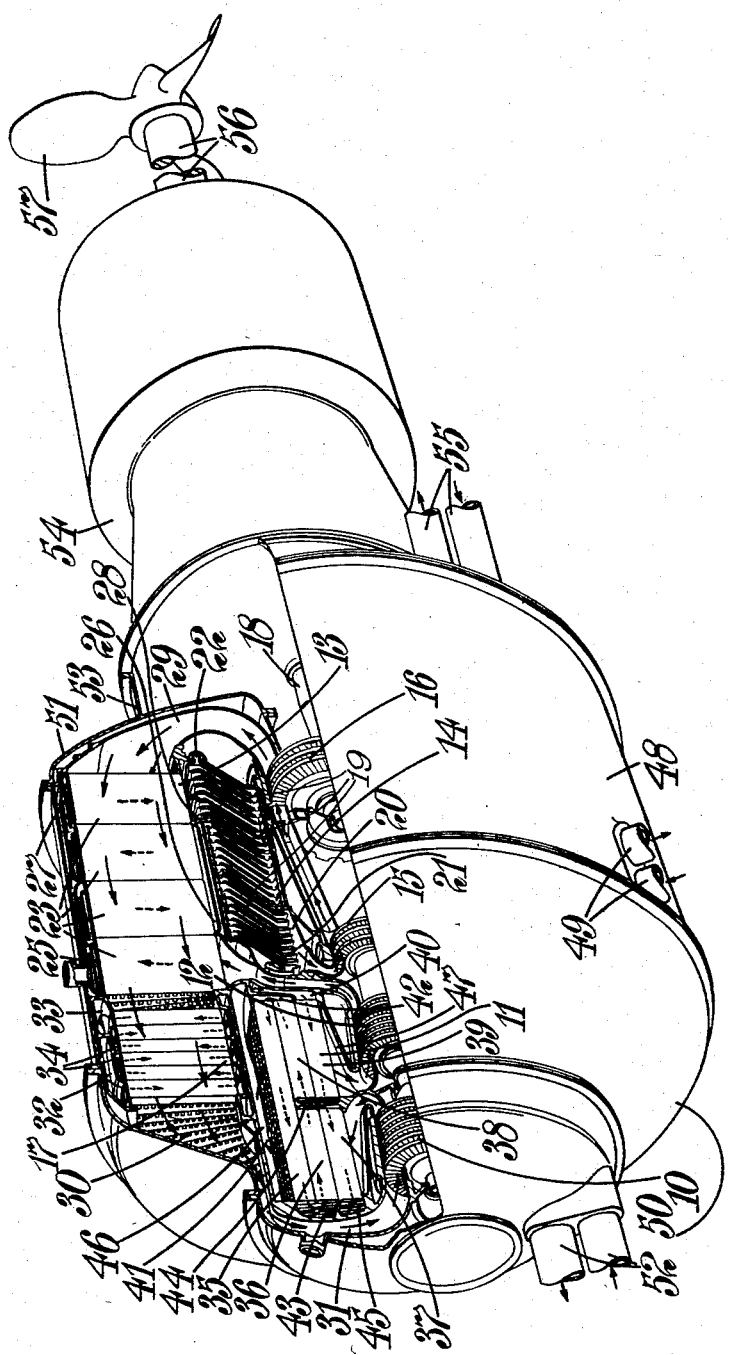

2,870,608

CLOSED CYCLE GAS TURBINE POWER PLANT

Cecil Alastair Comyns-Carr, Coxbench, England, assignor to Rolls-Royce Limited, Derby, England, a British company Application November 26, 1956, Serial No. 624,310

Claims priority, application Great Britain December 8, 1955

6 Claims. (Cl. 60—59)

This invention relates to power plant comprising a gas-turbine engine operating on a closed cycle and having a power output shaft. Such a power plant will be referred to as a power plant of the type specified.

According to this invention, in a power plant of the type specified, the gas turbine engine has rotary compressor means for the working fluid and turbine means for driving the compressor means and the power output shaft arranged co-axially in line with one another and centrally within at least two annular heat-exchangers wherein the working fluid is respectively heated before entering the turbine means and cooled after passing through the turbine means, and the gas-turbine engine and heat exchangers are enclosed in a drum-like casing having connections through which the cooling fluid is led to and from the heat-exchanger wherein the working fluid is cooled. The compressor means and the power output shaft may be driven by the same turbine or by independent turbines.

Preferably, the heat-exchanger, wherein the working fluid is heated, is supplied with a heating fluid obtained from an external source and closely surrounds and extends axially along the length of the turbine means and the heat-exchanger, in which the working fluid is cooled, encircles the compressor means.

In one preferred construction, there is also provided within the drum-like casing annular heat-exchange means wherein the working fluid leaving the turbine means passes in heat exchange with working fluid leaving the compressor means, and this heat-exchange means surrounds the heat-exchanger wherein the working fluid is heated by the heating fluid.

One construction of power plant according to this invention will now be described in detail with reference to the accompanying drawing.

The power plant comprises a gas turbine engine of the compound type working on a closed cycle. The engine includes a multi-stage axial-flow low-pressure compressor 10, an intercooler 11, a multi-stage axial-flow high-pressure compressor 12, a recuperator 13, a main heater 14, a compressor-driving multi-stage axial-flow turbine 15 and a power turbine 16 connected in flow series. The working fluid exhausting from the power turbine flows in turn through the recuperator 13 to preheat the working fluid leaving the high-pressure compressor 12, and a precooler 17 from which the working fluid is led back to the inlet of the low-pressure compressor 10.

The rotors of the low-pressure compressor 10, the high-pressure compressor 12 and the compressor-driving turbine 15 are mounted in axially-spaced relation on common shafting, and the rotor of the power turbine 16 is co-axial with and axially-spaced from the compressor-driving turbine 15 on the side thereof remote from the compressor rotors. The power output shaft 18 of the power-turbine 16 extends axially from the power turbine on the side thereof remote from the other rotors.

The main heater 14 for the working fluid is a heat exchanger of annular form which closely surrounds the two turbines 15, 16 and extends axially from adjacent the inlet to the compressor-driving turbine 15 to adjacent the outlet of the power turbine 16. The main heater comprises a number of stacks 19 of axially-spaced conical annular metal plates with their inner and outer peripheries joined together, and the spaces between the plates which receive the working fluid contain secondary heat-exchange surfaces. The plates are formed with rings of aligned ports adjacent their inner and outer peripheries, the metal around some ports in each ring being deformed into contact and joined to the adjacent plate on one side and the metal around the remaining ports being deformed into contact with and joined to the adjacent plate on the other side so as to form, at both the inner periphery of the stack and the outer periphery, two sets of axially-extending manifolds, the manifolds of one set communicating with alternate spaces between the plates and the other set communicating with the remaining spaces.

There may be three such stacks 19 end to end with the manifolds in each stack in register with those of the next, so that the preheated working fluid from the recuperator 13 enters the outer periphery of the stack adjacent the power-turbine and flows radially inwards through the appropriate spaces, passes into the next stack 19 at its inner periphery and flows radially outwards, and passes into the stack 19 adjacent the compressor-driving turbine 15 at its outer periphery and flows inwardly through it to be collected in an annular manifold 20 for delivery to the compressor-driving turbine 15, and so that the heating fluid takes a reverse path through the appropriate spaces starting from an annular manifold 21 at inner radius of the heater and adjacent the compressor-driving turbine 15 and terminating at an annular collector manifold 22 at outer radius and adjacent the power-turbine.

The heating fluid may in this case be liquid sodium which has been heated by an external source, for example by a nuclear reactor.

The recuperator 13 is also of annular form and closely surrounds the main heater 14.

In one convenient form the recuperator is of four-pass construction on the high-pressure side and comprises four sets 23 of flat tubes. The tubes in each set 23 extend radially and are disposed in annular formation, being circumferentially spaced apart by spacer elements forming secondary heat-exchange surfaces and having their ends opening to manifolds. Secondary heat-exchange surfaces are also provided in the tubes. Each set is formed as a number of segmental units, and the segmental units of each of the four sets are aligned axially. The manifolds are associated with the four aligned segmental units, one manifold at the outer ends of the tubes joining the segmental units of the first and second sets of tubes, a second manifold at the inner ends of the tubes joining the segmental units of the second and third sets, and so on. The whole recuperator 13 surrounds and extends axially along the length of the main heater 14. It is arranged that working fluid leaving the high-pressure compressor 12 enters the set 23 of tubes adjacent the compressor-driving turbine 15 at inner radius, flows radially outwards through this set of tubes to the transfer manifolds 25 at their outer ends through which the working fluid passes to the radially outer ends of the next adjacent set 23 of tubes, flows inwardly through this set of tubes to the transfer manifolds 26 at inner radius which transfers the working fluid to the third set 23 of tubes, flows radially outwards through the third set of tubes to further transfer manifolds 27 at outer radius which transfers the working fluid to the fourth set 23 of tubes and then flows radially inwards through the fourth set of tubes into a manifold 28 which is also in direct communication with the appropriate spaces between the stack 19 of plates forming the part of the main heater 14 adjacent the power turbine 16.

As has been said, the working fluid is pre-heated in the recuperator 13 by passing in heat exchange with the working fluid leaving the power turbine 16. The working fluid leaving the power turbine 16 is conveyed from the outlet of the power turbine through an annular ducting structure 29 to the end of the recuperator 13 adjacent the fourth set 23 of tubes and it flows in an axial direction through the spaces between the four sets of tubes, and thus over the spacer elements which form the secondary heating surfaces, to be delivered at the end of the recuperator 13 adjacent the compressor into the precooler 17.

The precooler 17 may be of similar construction to the recuperator 13 and may provide, say, for six radial passes of the cooling fluid. The working fluid flows without substantial deviation from the recuperator 13 through the spaces between the sets of tubes forming the precooler 17 to an annular collector chamber 30 adjacent the low-pressure compressor end of the engine and the working fluid is led radially inwards from the collector chamber 30 through annular ducting 31 leading to the inlet of the low-pressure compressor 10. The cooling fluid employed in the precooler 17 is, for instance, water and it is fed to and withdrawn from the precooler by a pair of manifolds 32, 33 at the outer radius of the precooler 17 and these manifolds may also surround transfer manifolds 34 at the outer radius of the precooler 17.

The intercooler 11 is also of annular form, is encircled by the precooler 17 and closely surrounds the low-pressure and high-pressure compressors 10, 12. It extends from adjacent the inlet to the low-pressure compressor 10 to adjacent the outlet of the high-pressure compressor 12. The intercooler 11 is of similar form to the recuperator 13 and the precooler 17 but in this case the tubes are arranged to extend axially and the working fluid is arranged to flow radially through the spaces between them. In one form there are five sets of tubes of which the outermost set of tubes 35 extends along the length of the intercooler and the remaining four sets are approximately half the length of the outermost set. Two of these sets 36, 37 are arranged in radial alignment with the long tubes of set 35 at the end adjacent the low-pressure compressor and the remaining two sets 38, 39 are arranged in radial alignment with the long set adjacent the high-pressure compressor. With this arrangement the cooling fluid, which is conveniently water, flows from a manifold 40 adjacent the outlet of the high-pressure compressor into the radially innermost set 39 of shorter tubes at this end, flows from these tubes into a transfer manifold 41 at the mid length of the intercooler, flows from this transfer manifold through the aligned set 38 of shorter tubes back to a manifold 42 adjacent the high-pressure compressor outlet, flows from this manifold through the outermost set of tubes 35 into a transfer manifold 43 at the opposite end of the intercooler, flows from this manifold through radially outermost set of shorter tubes 36 at the low-pressure compressor end of the intercooler into a transfer manifold 44 at the mid length of the intercooler and finally flows through the innermost set of shorter tubes 37 at the low-pressure compressor end of the intercooler to a delivery manifold 45. The working fluid compressed in the low-pressure compressor flows radially outwards through the spaces between the tubes at the end of the intercooler adjacent the low-pressure compressor into a manifold 46 surrounding the tubes, and then radially inwards between the tubes at the high-pressure compressor end of the intercooler to a further annular manifold 47, to be delivered into the intake of the high-pressure compressor 12.

The whole annular structure formed by the engine compressors 10, 12 and turbines 15, 16, the main heater 14, the recuperator 13, the precooler 17, and the intercooler 11 is enclosed within a drum-like casing having a main cylindrical portion 48 provided with connections 49 for the water supply to the precooler and having a pair of end cover plates 50, 51. The cover plate 50 at the low-pressure compressor end is domed and has connections 52 for the cooling water of the intercooler. The cover plate 51 at the power turbine end is of suitable form to permit the power output shaft 18 to extend through it, and has an axially-extending bolting flange 53 thereon to which is secured the casing 54 of a reduction and reversing gear. This cover plate 51 also has suitable connections 55 for conveying the heating fluid e. g. the liquid sodium or other liquid metal, to and from the main heater. The heating fluid may in other examples be steam or other gas. The reversing and reduction gear has extending from it a main shaft 56 which may for instance carry a marine screw 57.

The construction just described has a number of advantages as compared with the conventional arrangement in which a heat exchanger, a precooler, an intercooler and a heater are housed in separate cylindrical casings interconnected by suitable ducting. These advantages may be summarized as follows.

The construction described enables a heat exchanger of large cross-section area to be accommodated in a compact power plant. The flow distribution at inlet and outlet from the various components of the engine is substantially symmetrical. The length of ducting between the various components is reduced to a minimum, thereby reducing the pressure losses, and the absence of external working fluid ducting eliminates bellows connections and similar joints which tend to produce heavy localised loads on the casings. Also the single gas-tight outer casing may be arranged to be subjected to the lowest pressure of the closed cycle.

The use of the single casing makes possible a substantial saving of weight, and further the power plant may have a simple mounting arrangement, the casing being supported at say three points. The "void" volume is kept to a minimum, that is the volume within the pressure casings which is unused and filled with working fluid. Thus increasing and decreasing power, which is done by raising or lowering the pressure level in the cycle, is facilitated.

In another construction, instead of the main heater 14 being provided, the working fluid may be withdrawn from the plant after leaving the recuperator 13 and taken to some external heating means e. g. a nuclear reactor, and then returned to the inlet of the compressor-driving turbine 15.

I claim:

1. A power plant comprising a compressor having inlet and delivery ends, turbine means coaxially arranged with the compressor and drivingly connected thereto, said turbine means having an inlet and an exhaust outlet, an annular heater coaxial with and surrounding the turbine, said heater having a first fluid flow path wherein working fluid is indirectly heated, an annular recuperator coaxial with and surrounding said annular heater, said recuperator having first and second fluid flow paths, the first fluid flow path of the recuperator and the first fluid flow path of the heater being connected in flow series arrangement between the delivery of the compressor and the inlet of the turbine means, and the second flow path of the recuperator being connected to receive exhaust gas from the turbine means and being connected to the inlet of the compressor, whereby the power plant operates on a closed cycle, annular cooler means coaxial with and surrounding the compressor, said cooler means having a first fluid flow path connected to receive gas flowing in said closed cycle and a second fluid flow path carrying a coolant fluid, a pressure-tight casing enclosing the assembly formed by said compressor, turbine means, heater, recuperator and cooling means, and said casing having coolant fluid inlet and outlet connections connected with said second fluid flow path of the cooling means, and a power output shaft coaxial with and driven by the turbine means and extending from the casing.

2. A power plant according to claim 1, wherein said heater also comprises a second fluid flow path carrying a heating fluid for conveying heat to the working fluid by heat exchange, and the casing has heating fluid inlet and outlet connections leading to said second fluid flow path of the heater.

3. A power plant according to claim 1, wherein said compressor has coaxial low-pressure and high-pressure sections, and said annular cooling means comprises an annular intercooler closely surrounding the compressor sections and having its first fluid flow path connected in flow series arrangement between the low-pressure and high-pressure compressor sections, and its second fluid flow path connected with the coolant fluid inlet and outlet connections.

4. A power plant according to claim 3, comprising also an annular precooler within the pressure-tight casing coaxially with and surrounding the intercooler, said precooler having a first fluid flow path interconnecting the first flow path of the recuperator and the inlet of the compressor and a second fluid flow path carrying coolant fluid, and said casing having further coolant supply connections leading to the second fluid flow path of the precooler.

5. A power plant according to claim 1, wherein said annular cooling means comprises an annular precooler, said precooler having its first fluid flow path interconnecting the first flow path of the recuperator and the inlet of the compressor and its second fluid flow path carrying coolant fluid.

6. A power plant according to claim 1, the casing comprising a main cylindrical portion and end covers secured to the ends of the main cylindrical portion, the power output shaft extending through one of said end covers, and comprising also a reduction gear driven by said shaft and having a casing secured to said one of the end covers.

References Cited in the file of this patent

UNITED STATES PATENTS

| | | |
|---|---|---|
| 2,453,928 | Oechslin | Nov. 16, 1948 |
| 2,709,893 | Birmann | June 7, 1955 |

FOREIGN PATENTS

| | | |
|---|---|---|
| 726,347 | Great Britain | Mar. 16, 1955 |